(12) United States Patent
Abzarian et al.

(10) Patent No.: US 8,443,433 B2
(45) Date of Patent: May 14, 2013

(54) DETERMINING A MERGED SECURITY POLICY FOR A COMPUTER SYSTEM

(75) Inventors: David Abzarian, Kirkland, WA (US); Gerardo Diaz Cuellar, Redmond, WA (US); Mark Vayman, Redmond, WA (US); Eran Yariv, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 929 days.

(21) Appl. No.: 11/823,837

(22) Filed: Jun. 28, 2007

(65) Prior Publication Data

US 2009/0007219 A1   Jan. 1, 2009

(51) Int. Cl.
*H04L 29/06* (2006.01)

(52) U.S. Cl.
USPC .......................................................... 726/11

(58) Field of Classification Search .................. None
See application file for complete search history.

(56) References Cited

U.S. PATENT DOCUMENTS

| | | |
|---|---|---|
| 6,789,202 B1 | 9/2004 | Ko et al. |
| 7,032,022 B1 | 4/2006 | Shanumgam et al. |
| 7,047,562 B2 | 5/2006 | Peterson et al. |
| 7,257,833 B1 * | 8/2007 | Parekh et al. ............ 726/1 |
| 2004/0268150 A1 | 12/2004 | Aaron |
| 2005/0268331 A1 | 12/2005 | Le et al. |
| 2006/0010491 A1 | 1/2006 | Prigent et al. |
| 2006/0085838 A1 * | 4/2006 | Samuelsson et al. ............ 726/1 |
| 2006/0129808 A1 | 6/2006 | Koti et al. |
| 2006/0195896 A1 | 8/2006 | Fulp et al. |
| 2006/0282887 A1 | 12/2006 | Trumper et al. |
| 2007/0016945 A1 | 1/2007 | Bassett et al. |

OTHER PUBLICATIONS

Yuan et al., "FIREMAN: A toolkit for FIREwall Modeling and Analysis," University of California, Davis, http://www.cs.ucdavis.edu/~prasant/pubs/conf/fireman.pdf, 3 pgs.
Al_Shaer et al., "Modeling and Management of Firewall Policies," http://www.cs.utexas.edu/users/alex/publications/citations/fdd/tnsm04.pdf, pp. 1-10.
Thomsen et al., "Napoleon Network Application Policy Environment," http://delivery.acm.org/10.1145/320000/319185/p145-thomsen.pdf?key1=319185&key2=1102567711&coll=GUIDE&dl=GUIDE&CFID=17461500&CFTOKEN=63727901, pp. 145-152.

* cited by examiner

*Primary Examiner* — Gilberto Barron, Jr.
*Assistant Examiner* — Simon Kanaan (57) ABSTRACT

Embodiments of the invention described herein are directed to a mechanism for determining whether at least one operation will be effective in view of at least one security policy. In exemplary implementations, determining whether at least one operation will be effective in view of at least one security policy may comprise determining a merged security policy for a computer system by merging security policies for the computer system from two or more sources. The security policies may be security policies set by a user and/or an administrator of the computer system, may be security policies of a computer network to which the computer system is connected, or may be security policies of one or more other computer systems that are above the computer system in a computer network hierarchy.

10 Claims, 10 Drawing Sheets

DETERMINING A MERGED SECURITY POLICY FOR A COMPUTER SYSTEM

BACKGROUND OF INVENTION

Since the development of computer networks, security has been a concern of administrators of computer systems and computer networks. As a result, many different methods of securing computers have been used. A computer system may have one or more facilities that apply security policies for the computer. Further, a computer system may be disposed within a computer network that implements additional security policies that impact the computer system (and possibly other) in the computer network. For example, a computer network may have one or more network computer systems that can be considered to sit above the computer system in a computer network hierarchy, and that must approve and/or relay communications to and from the computer system and possibly other devices in the network.

One security facility that has been used for computer systems and computer networks is a firewall. Firewalls provide security for computer systems by regulating, according to one or more firewall policies, what data is allowed into and out of a single computer or a computer network. Firewalls may be installed in different places on a network. For example, firewalls may be installed on a computer system that is dedicated to implementing the firewall and that is placed at an entry/exit point for the entire network or some portion of it (i.e., the "edge" of the network). Alternatively, firewalls may be installed locally on a single computer system to be protected. Based on certain parameters, data may be allowed to pass through the firewall to its destination or may be blocked by the firewall. These parameters may be based on a variety of data characteristics and are regulated by firewall rules stored by the firewall policy.

SUMMARY OF INVENTION

Embodiments of the invention described herein are directed to a mechanism for determining whether at least one operation will be effective in view of at least one security policy. In exemplary implementations, determining whether at least one operation will be effective in view of at least one security policy may comprise determining a merged security policy for a computer system by merging security policies for the computer system from two or more sources. The security policies may be security policies set by a user and/or an administrator of the computer system, may be security policies of a computer network to which the computer system is connected, or may be security policies of one or more other computer systems that are above the computer system in a computer network hierarchy.

In one embodiment, there is provided at least one computer-readable medium having encoded thereon computer-executable instructions which, when executed, perform a method. The method comprises retrieving a plurality of security policies, merging the plurality of security policies into a merged security policy, and determining whether at least one operation will be effective in view of the merged security policy.

In another embodiment, there is provided an apparatus for use in a computer environment. The computer environment comprises at least one computer system and a plurality of security facilities that each implements at least one security policy for the computer system. The apparatus comprises at least one processor programmed to receive at least one input regarding at least one operation and retrieve at least two security policies from the plurality of security facilities. The processor is further programmed to determine a merged security policy by aggregating the at least two security policies, and determine whether the at least one operation will be effective in view of the merged security policy.

In a further embodiment, there is provided a method for use in a computer environment comprising at least one computer system and a plurality of security facilities that each implements at least one security policy for the computer system. The plurality of security facilities comprises a first security facility. The method comprises determining whether a merging of a plurality of security policies specified for the computer system permits at least one first security policy specified to be implemented via the first security facility to be effective in the computer system.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Applicants have appreciated that a computer system may receive from a multitude of sources configuration settings that specify security policies impacting how the computer system may operate. For example, a user and an administrator of a computer system may each specify certain security configuration settings, such as firewall rules for a firewall policy, that impact how the computer system may be used by the user. Additionally, a computer network to which the computer system is connected may specify additional security policies, such as additional firewall rules, that impact how the computer system may operate in the computer network. A computer system may also be impacted by the configuration settings of other computer systems, (e.g., by a firewall on a dedicated computer system located above the computer system in a computer network hierarchy).

Applicants have further appreciated that the existence of multiple security policies—for example, a user security policy, an administrator security policy, a network group security policy, and other security policies in the network—which together affect the operations of a computer system may lead to inconsistencies between the security policies. For example, one security policy may allow a particular operation while another security operation that supersedes the first may block it either specifically or generally (i.e., based on a broad policy that applies to the particular operation and other operations). Applicants have appreciated that this can cause problems as some applications may require particular security settings (e.g., may require any firewalls to allow certain communications) to function properly, and if such applications are not functioning properly because necessary communications are being blocked, a user whose operation is being blocked by one or more security policies may have difficulty in determining which security policy is blocking the operation.

In view of the foregoing, one embodiment of the present invention is directed to a mechanism for determining whether at least one operation will be effective aggregating security policies from two or more sources in the environment to determine a merged security policy that is an overall security policy for a computer system in a particular environment by. The multiple security policy sources may be on the computer system itself, or may extend beyond the computer system to other parts of the environment. Determining whether at least one operation will be effective may comprise making any suitable determination, including determining whether security policies needed for the at least one operation to complete successfully are in place in the merged security policy, or determining whether one or more security policies of the merged security policy prevent the at least one operation from being effective.

One example of a security policy discussed above (and in some illustrative embodiments discussed below) is a firewall. However, it should be appreciated that, as used below, a security policy is not limited in this respect and may comprise any configuration setting on a computer system relating to access to the computer system, including any configuration or setting relating to what information may be sent or received by the computer system or how information may be sent or received by the computer system. For example, a security policy may comprise firewall rules and firewall settings for a firewall, Internet Protocol Security (IPsec) connection security policies, Software Restriction Policies and/or Code Integrity Policies to restrict what software/code may be loaded and/or executed, Intrusion Prevention System/Intrusion Detection System policies, and/or any other suitable security method. Further, it should be appreciated that reference to a security policy permitting at least one operation to be effective may be a security policy that specifically authorizes the at least one operation, or to a security policy that does not prevent the at least one operation from being performed.

Figure 1:
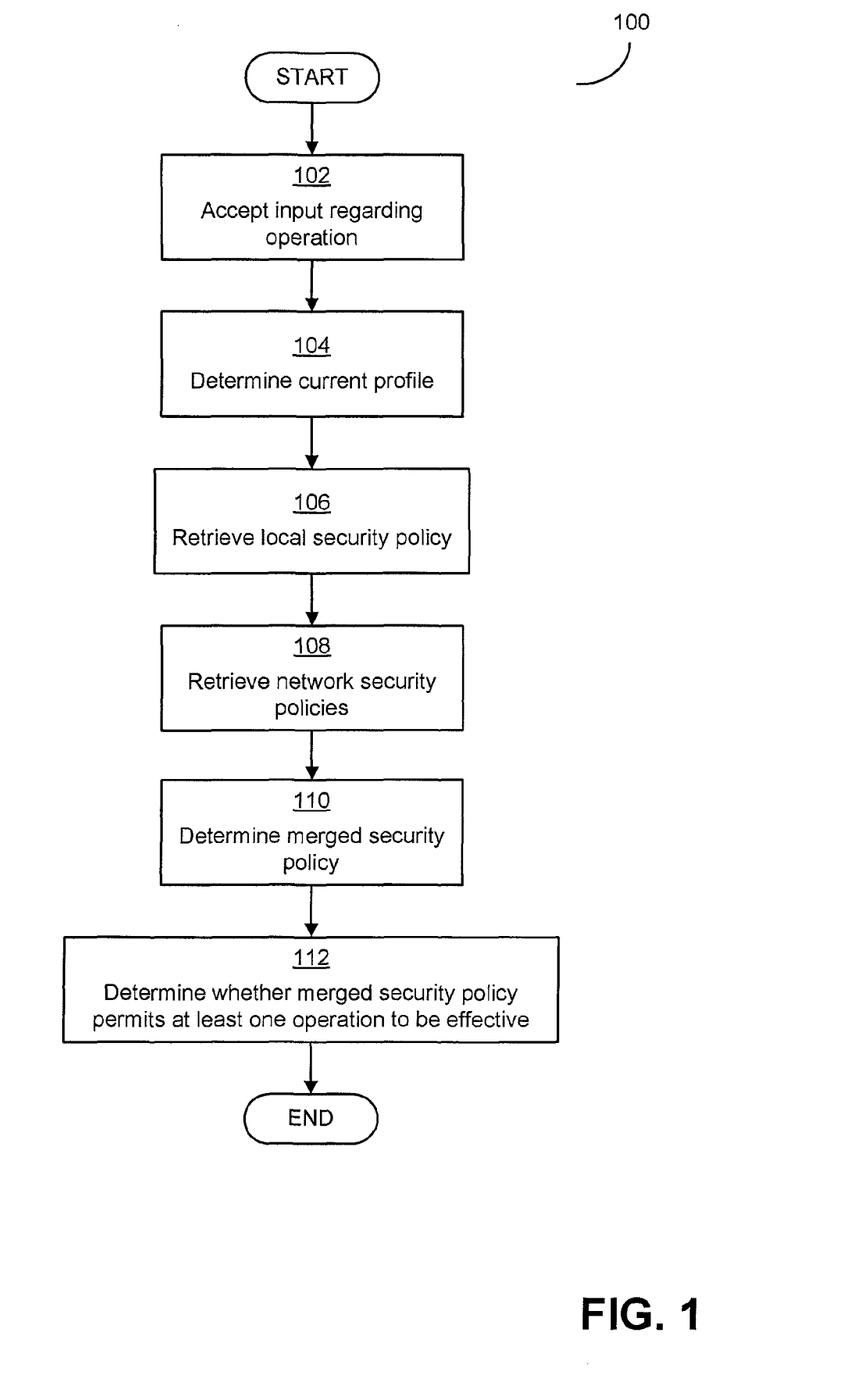
FIG. 1 is a flowchart of an illustrative process that may be implemented in accordance with one embodiment of the invention to determine whether a merged security policy permits a specific operation.

FIG. 1 shows an illustrative process 100 that may be implemented by one or more computer systems in accordance with embodiments of the invention to determine whether at least one operation will be effective in view of a merged security policy. It should be appreciated that the process 100 is merely exemplary, and embodiments of the invention that determine whether a merged security policy permits at least one operation to be effective may be implemented in any suitable way.

The process 100 begins in block 102, wherein the process accepts input regarding at least one operation to be completed. This input may come from, for example, a user or a computer application, may be related to any operation(s) to be completed by the computer system as requested by the user or application, and may identify the operation in any suitable way. For example, a computer application may have a need to execute at least one operation to transmit a certain type of data to and/or receive a certain type of data from a particular remote computer, and the process in FIG. 1 may determine whether the at least one operation will be effective in view of a merged security policy (i.e., whether the computer application will be capable of communicating the certain type of data to the particular remote computer) before the computer application initiates communication with the remote computer. As a further example, the computer application may require that a security policy be modified to function properly, and determining whether the at least one operation will be effective may comprise determining whether the modified security policy may be effective in view of a merged security policy. For example, the at least one operation may comprise an operation to add a security policy comprising a firewall rule that permits communicating a certain type of data and/or communicating with a particular remote computer, or modifying an existing security policy to add such a firewall rule to the existing security policy, and the process may determine whether the computer application will be permitted to implement the firewall rule and/or whether the firewall rule will be effective in the broader computer environment (e.g., whether the firewall rule will be ineffective because it is superseded by other firewalls outside of the control of the computer system on which the application is executing). It should be appreciated that these operations are merely exemplary, as processes implemented by embodiments of the invention may determine whether a merged security policy permits operations of any suitable type.

The process 100 continues to block 104, wherein the process determines the current profile in which the computer system is operating. In some embodiments of the invention, security policies may be defined based on environments and profiles, such that different security policies may be specified for the computer system depending on the environment in which it is operating. For example, a profile may indicate that the user is in a "private" environment (e.g., a home network), a "domain" environment (e.g., a managed enterprise network), or a "public" environment (e.g., a coffeehouse network), and security policies may differ accordingly (e.g., stricter security in the public environment than the private environment).

Once the current profile is determined in block 104, the process 100 continues to block 106 where the local security policies for the computer system are retrieved. The local security policies may have been established (e.g., by a user or computer application executing on the computer system) specifically for the current user(s) of the computer system, or may have been established by an administrator of the computer system for all users of the computer system, including the current user. The local security policies may comprise a network group security policy that has been established for a computer network to which the computer system is connected and which may have been, for example, provided to the computer system by another computer system in the computer network (e.g., an authentication server in the network) at the time the computer system connected to the computer network. This network group policy may be applied to all computer systems on the computer network, including the computer system, or may apply only to a group of computer systems in which the computer system has been classified (e.g., based on which subnet the computer system is in). Further, the group policy may be dependent on which user is current using the computer system, or it may not.

After retrieving the local security policy in block 106, the process 100 retrieves the network security policy in block 108. This may comprise retrieving from one or more other computer systems in a hierarchy of the computer network security policies that may affect how the computer system operates. These other computer systems may comprise, for example, dedicated computer systems hosting security facilities such as firewalls. Exemplary processes for retrieving network security policies will be discussed in greater detail below.

Once the local security policies and the network security policies have been retrieved, the process 100, in block 110, determines a set of merged security policies. This may be done in any suitable manner. In one embodiment of the invention, a merged security policy may be determined by determining the aggregate impact of all of the security policies set at each level in the hierarchy (e.g., user, administrator, group, network, or any other suitable hierarchy) to arrive at one merged security policy that adopts the most stringent parameters of each of the security policies. After the merged security policy has been determined, the process 100 proceeds to block 112 to compare the at least one operation from block 102 to the merged security policy to determine whether the at least one operation will be effective in view of the merged security policy. This may be done in any suitable way. For example, the operation may be analyzed to determine what type or types of permissions or resources are necessary for the operation to be effective, and those permissions and resources may be compared to the permissions and resources allowed or blocked by the merged security policy. Determining what type or types of permissions or resources are necessary for the at least one operation to be effective may be done in any suitable manner, such as by analyzing the at least one operation (e.g., analyzing what Internet Protocol (IP) address and/or port will be used to communicate information when executing the at least one operation), or by analyzing permissions information for the at least one operation explicitly specified in the input accepted in block 102. If, after comparing the at least one operation to the merged security policy, it is determined that the necessary permissions and resources are available, then the process may predict that the at least one operation will be effective in a real-world environment. This prediction may be passed back to a user or an application that has initiated the process 100 in the form of a message indicating predicted success or failure, or may be presented for use in any other suitable manner.

The determination in blocks 110 and 112 of a merged security policy and whether a merged security policy permits at least one operation to be effective may be made in any suitable manner. As an example, in one embodiment of the invention, in block 110 security policies may be iteratively added to a single data structure from the top of a security policy hierarchy to the bottom such that when all security policies have been added, the data structure stores the overall effective security policy (i.e., the merged security policy). The single data structure storing the overall effective security policy may then be queried to determine whether it permits the at least one operation to be effective.

Adding the security policies to the single data structure may be done in any suitable manner. For example, the security policies may be added in order of a hierarchy (for example, highest in the hierarchy to lowest in the hierarchy) and may be broken down into sub-elements as they are added to the data structure. As each additional sub-element is evaluated, it may be examined to determine whether it should be added to the data structure by determining whether the sub-element will have a meaningful effect on the merged security policy if added, or whether it is effectively superseded by or overruled by another security policy or sub-element of a security policy already added to the data structure.

For example, if a firewall rule (as a sub-element of a security policy) is being evaluated to determine if it should be added to the merged security policy, the process 100 may determine whether another firewall rule that conflicts with the firewall rule being evaluated has previously been added to the merged security policy. For example, if the firewall rule being evaluated allows a certain type of communication and a previously-added rule blocks that type of communication (e.g., either explicitly or as part of a broader class of blocked communications), then the firewall rule being evaluated may be skipped because the previously-added rule would overrule the firewall rule being evaluated and would block the certain type of communication. As a further example, if the firewall rule being evaluated allows a certain type of communication and the previously-added firewall rule blocks a subset of the certain type of communication, then an edited version of firewall rule being evaluated may be added to the data structure such that only the communications that would not be blocked by the previously-added firewall rule would be allowed. It should be appreciated that a previously-added firewall rule may block a certain type of communication even if the previously-added rule does not have a specific firewall rule requiring the blocking. For example, some firewalls block communications by default and only allow communications when a firewall rule specifically authorizes them. Thus, such a firewall will block any communication that is not authorized by a specific firewall rule set for that firewall.

Sub-elements may also be skipped over during the process of creating the merged security policy if the impact of the evaluated sub-element is already provided for by a previously-added sub-element. For example, if a firewall rule being added allows a certain type of communication and a previously-added firewall rule also allows that type of communication (either explicitly or as part of a broader class of communication) then the firewall rule being evaluated may be skipped over and not added to the merged security policy because the desired effect of the firewall rule has already been achieved in the merged security policy (i.e., the implicated type of communication is already allowed).

In alternative embodiments of the invention, rather than a single overall data structure being created by aggregating the impact of individual security policies, a merged security policy may be developed based on the compiled local and network security policies by grouping together data structures specifying each security policy, along with metadata specifying any hierarchical relationship among them. The group of data structures may then be queried to determine whether the resulting merged security policy permits a specific operation to be completed. The group of data structures and metadata about their hierarchical relationship may be queried in any way to determine if at least one operation would be effective in view of the merged security policy, as this embodiment of the invention is not limited in this respect. For example, each data structure may be evaluated to determine if the at least one operation is allowed and if it is prevented from being effective by any of the data structures then it may be determined that the at least one operation will not be effective in view of the merged security policy.

In other alternative embodiments of the invention, rather than comparing all the requirements of at least one operation (e.g., the operation from block 102) to the merged security policy to determine whether the specific operation would be blocked, the merged security policy (e.g., specified in the form of either a single data structure or multiple data structures) may be queried to determine if one or more particular requirements of at least one operation will be met by the environment. For example, in some embodiments of the invention, rather than determining whether at least one operation to communicate HTTP data over port 80 will be effective, the merged security policy may be queried separately to determine whether each security policy permits communication over port 80, and whether the merged security policy permits communication of HTTP data.

As discussed above, it should be appreciated that embodiments of the invention are not limited to implementing the exemplary process shown in FIG. 1, and that any suitable process for determining whether at least one operation will be effective in view of a merged security policy may be implemented.

Figure 2:
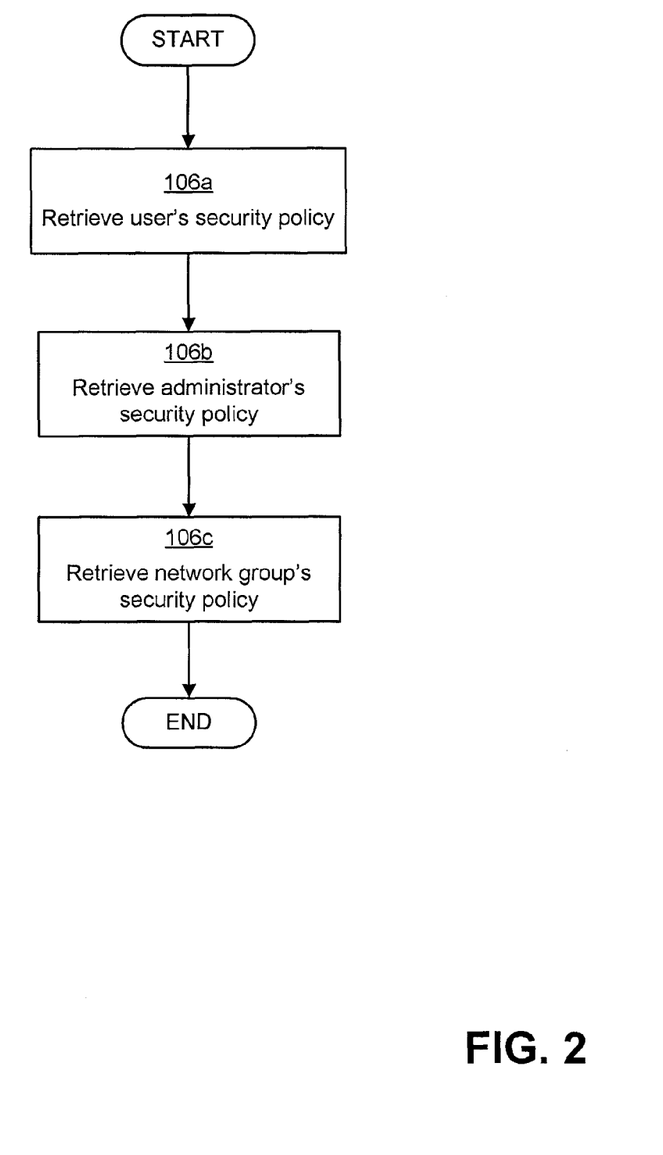
FIG. 2 is a flowchart of an illustrative process that may be implemented in accordance with one embodiment of the invention to retrieve local security policies as part of determining a merged security policy for a computer system.

FIG. 2 shows one illustrative process for implementing the block 106 (FIG. 1) of retrieving local security policies in accordance with some embodiments of the invention. It should be appreciated that the invention is not limited to implementing the exemplary process of FIG. 2 or to performing any or all of the acts shown in FIG. 2, as any suitable process may be employed for retrieving local security policies.

The process of FIG. 2 begins in block 106a, wherein the user's security policy is retrieved. This may be retrieved from a local store of security policies or from any other suitable storage medium. Once the user security policy is retrieved, then, in block 106b, the administrator's security policy is retrieved. This may also be retrieved from a local store, either the same local store as the local store storing the user security policy or a different local store, or from any other suitable storage medium. In block 106c, the network group's security policy is retrieved. Whether or not the computer system is connected to a computer network at the time process 200 is executed, a network group security policy may have previously been installed on the computer system (e.g., when it was connected to a computer network). In some embodiments of the invention, any such network group security policy may be considered in the process of determining whether a local security policy permits at least one operation to be effective. The network group security policy may be retrieved from a local store or from another computer system on the computer network (e.g., an authentication server on the computer network), or from any other suitable storage medium. Once the network group security policy is retrieved the process of block 106 ends (e.g., the overall process 100 of FIG. 1 may continue to retrieve the network security policies in block 108).

It should be appreciated that, in some embodiments of the invention, the process 200 may not retrieve every one of a user security policy, an administrator security policy, and a network group security policy, but may instead retrieve any combination of local security policies as part of determining a merged security policy.

Figure 3:
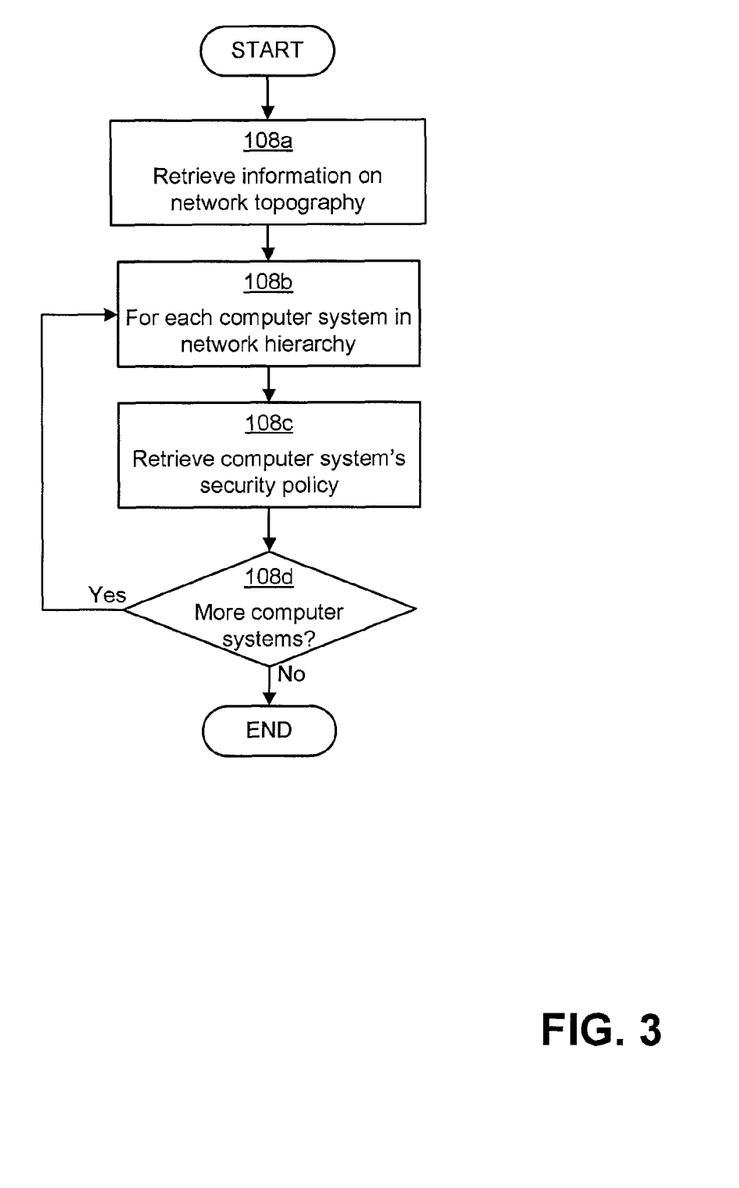
FIG. 3 is a flowchart of an illustrative process that may be implemented in accordance with one embodiment of the invention to retrieve network security policies as part of determining a merged security policy for a computer system.

FIG. 3 shows one illustrative process for implementing the block 108 (FIG. 1) of retrieving network security policies in accordance with some embodiments of the invention. It should be appreciated that the invention is not limited to implementing the exemplary process of FIG. 3 or to performing any or all of the acts shown in FIG. 3, as any suitable process may be employed for retrieving network security policies.

The process of FIG. 3 begins in block 108a, in which the computer system retrieves information on the topography (i.e., layout) of the computer network in which it is operating. This information may be retrieved in any suitable manner, examples of which are provided below. For example, in some embodiments of the invention this information may be retrieved from a local data store and may be associated with a profile of the computer system (e.g., the profile retrieved in block 104 of FIG. 1). In alternative embodiments of the invention, the network topography information may be retrieved from another computer system on the computer network, such as a network management server, the location or identify of which may also be indicated by the profile of the computer system. In still other embodiments of the invention, such as those implemented on or with Microsoft Windows, a Link Layer Topology Discovery technique may be implemented. For example, information on the network topography may be retrieved by querying the computer network by sending data out into the computer network and waiting for responses from network elements (e.g., computer systems such as clients, servers, switches, etc.) identifying themselves and/or their locations in the computer network. The information retrieved may identify a network hierarchy in which the computer system is located, or may be used to determine a network hierarchy.

As described above, computer systems that are above the computer system in a computer network hierarchy may have security policies that will affect the merged security policy of the computer system. Once information on the network topography is retrieved in block 108a, in block 108b the process 108 begins examining the computer systems that are above the computer system in the hierarchy. For each such computer system, the process 108 retrieves, in block 108c, the security policy of that computer system. In block 108d, the process 108 determines whether there are more computer systems to be examined and either continues examining computer systems or ends the process (e.g., the overall process 100 of FIG. 1 may continue to block 110 of FIG. 1).

It should be appreciated that the embodiments of the invention that merge security policies in a computer network are not limited to implementing the exemplary process shown in FIG. 3. In addition, some embodiments of the invention need not employ any process at all for merging the security policies of multiple computer systems in a computer network, as they may not determine a merged security policy from the security policies of multiple computer systems, but may instead determine a merged security policy only from the security information available on the computer system (e.g., local security policy).

Once a merged security policy is determined, embodiments of the invention may determine whether at least one operation will be effective in view of the merged security policy in any suitable way, as the invention is not limited to implementing any specific process for making this determination. Exemplary processes for implementing the block 112 (of FIG. 1) are discussed below in conjunction with FIGS.

4-7, but it should be appreciated that these processes are merely illustrative, and any suitable process may be implemented.

Figure 4:
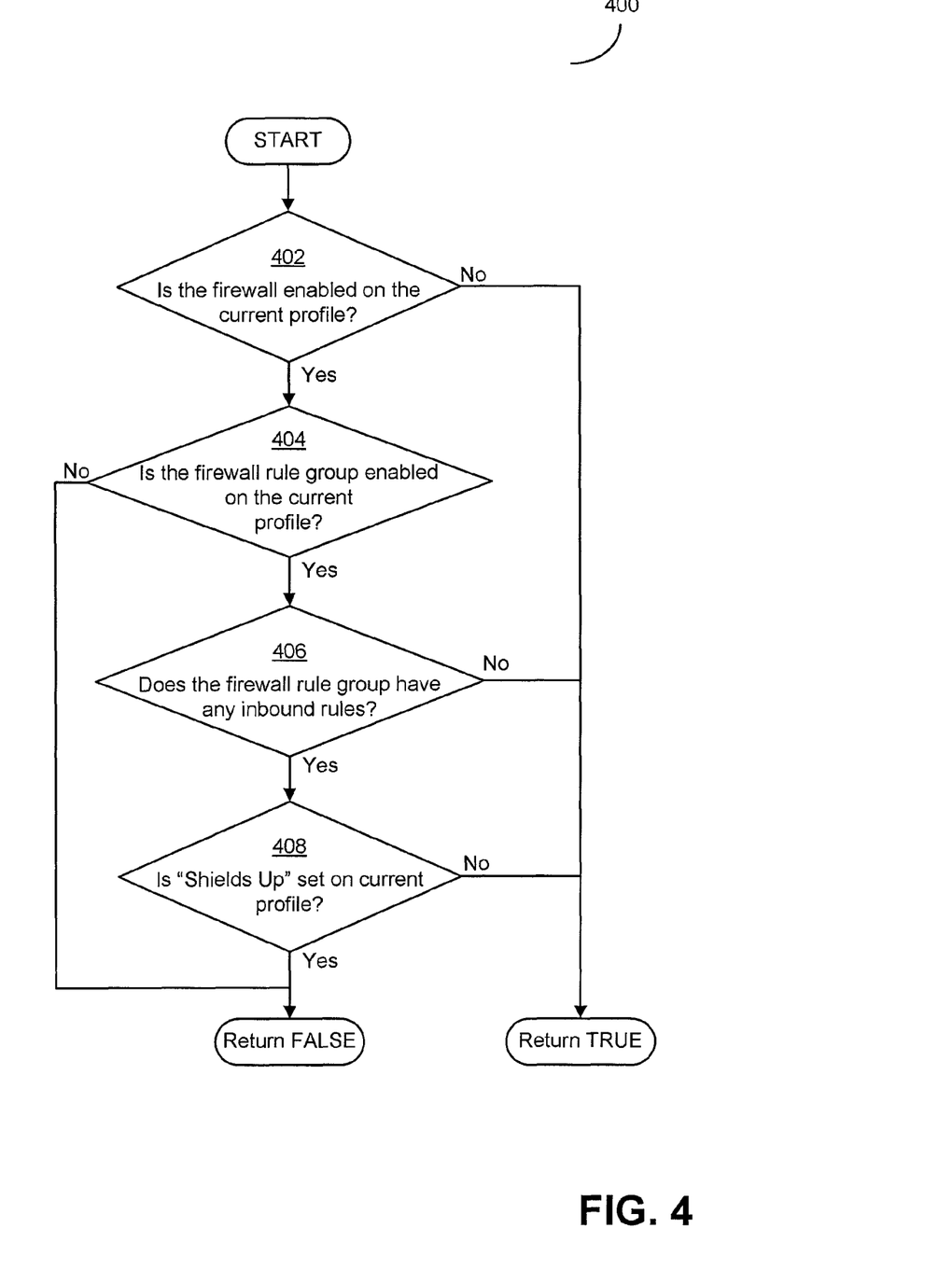
FIG. 4 is a flowchart of an illustrative process that may be implemented in accordance with one embodiment of the invention to determine whether a firewall rule group is operational in a merged security environment.

FIG. 4 shows an illustrative process 400 for determining whether at least one operation will be effective in view of a merged security policy. An operation such as a computer program application may require that multiple security parameters be appropriately set to function properly. For example, when the security parameters include firewall rules, these security parameters may be coordinated in a firewall rule group associated with the operation. The firewall rule group for an operation can be determined in any suitable way (e.g., by retrieving information stored on the computer system from which the operations initiates) and passed to the process of FIG. 4 in any suitable format. While the exemplary process 400 of FIG. 4 is limited to determining compatibility with firewall rules, embodiments of the invention are not limited in this respect and can determine compatibility with security methods other than firewalls either instead of or in addition to firewalls.

The process 400 begins in block 402 wherein it is determined whether a firewall is executing in the environment of the computer system that will execute the operation (i.e., executing locally on the computer system or on another computer system in the computer network). In many computer systems, when a firewall is turned off, the default action for filtering data received by the computer system is to allow all received data to pass to its intended recipient. Thus, if it is determined in block 402 that the firewall is not enabled, then the process 400 returns TRUE (indicating a prediction that the at least one operation will be effective) because the firewall is not blocking any traffic. If, however, a firewall is executing on the computer system, then in block 404 it is determined whether each firewall rule of the firewall rule group is enabled by the firewall. The process 400 may step through each firewall rule in the firewall rule group, querying the firewall to determine whether the firewall rule is enabled in the firewall. Querying in this manner may comprise examining a data store of each firewall rule for a data field indicating whether the firewall rule is enabled or disabled in the firewall (i.e., is being enforced by the firewall or is not being enforced by the firewall), or may be done in any other suitable manner. If any of the firewall rules are not enabled, then the process 400 returns FALSE, indicating a prediction that the at least one operation will not be effective because the firewall rules that are necessary for the at least one operation to be effective are not all enabled/enforced.

Block 404 may also comprise comparing firewall rules of the firewall rule group to firewall rules of other security policies to determine whether the firewall rule will be enabled in a merged security policy. This may comprise, for example, querying a single data structure storing a merged security policy for whether a firewall rule is implemented in the merged security policy, or may comprise querying multiple data structures each storing a security policy to determine whether a firewall rule is prevented from being enforced by another firewall rule of a security policy higher up in a hierarchy.

If all of the firewall rules are enabled, then the process 400 continues to block 406, wherein the process determines whether the firewall rule group has any firewall rules that regulate inbound traffic. If there are no inbound firewall rules, and all the firewall rules are enabled, then the process may predict that the at least one operation will be effective and the process will return TRUE to indicate this prediction. If there are inbound firewall rules, the process 400 may determine in block 408 whether or not a "Shields Up" or "Block all inbound traffic" function is enabled by the current profile. If the current profile indicates that the computer system is in a potentially hostile area (such as a public network in a coffeehouse), then the profile may enable a "Shields Up" optional function apart from the firewall that blocks all received traffic or blocks traffic more stringently. When a "Shields Up" option is used, the firewall may still indicate that firewall rules are enabled, so the process 400, to ensure that the at least one operation will be effective, also checks in block 408 for whether the option is set. If the option is set, then the process 400 returns FALSE, because the "Shields Up" option is preventing some traffic from being received and, therefore, the process 400 may predict that the at least one operation will not be effective. If, however, the "Shields Up" option is not set, then the process 400 may return TRUE, because all firewall rules in the firewall rule group are enabled/enforced and it may therefore be predicted that the at least one operation will be effective.

It should be appreciated that the embodiments of the invention which implement a process for determining whether at least one operation will be effective in view of a merged security policy by examining the merged security to determine whether a group of firewall rules are enabled are not limited to implementing the exemplary process shown in FIG. 4. Embodiments of the invention implementing such a process may implement any suitable process for determining whether at least one operation will be effective in view of a merged security policy.

Figure 5:
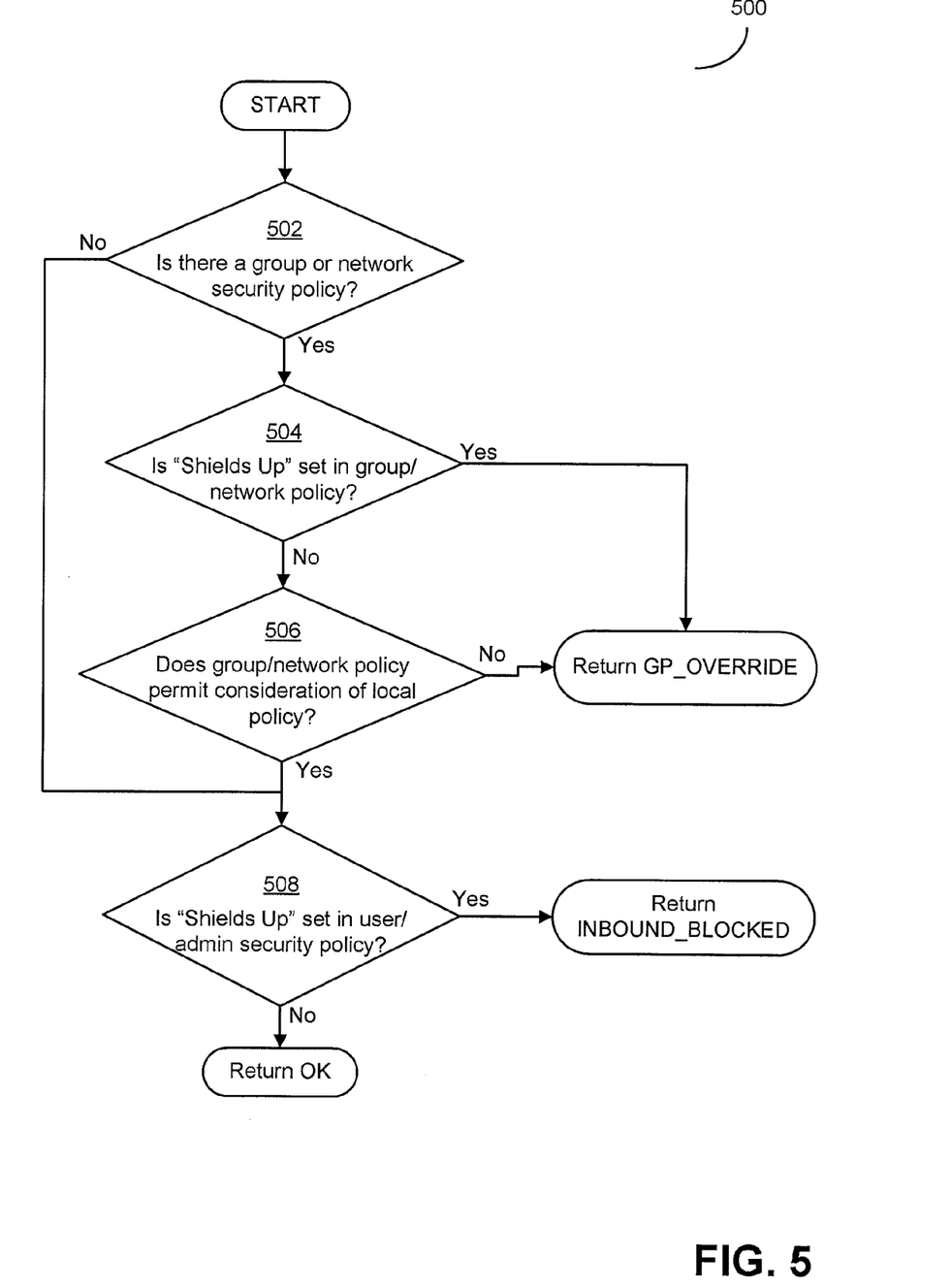
FIG. 5 is a flowchart of an illustrative process that may be implemented in accordance with one embodiment of the invention to determine whether configuration changes to a security policy may be made by a user or application.

FIG. 5 shows an illustrative process 500 for determining whether at least one operation to modify a user and/or an administrator security policy will be effective in view of a merged security policy. While the exemplary process 500 of FIG. 5 is limited to determining whether firewalls permit or prevent the at least one operation, embodiments of the invention are not limited in this respect and can make this determination with security methods other than firewalls either instead of or in addition to firewalls.

In one embodiment of the invention, the process 500 may take as input no information regarding any desired modifications. The process 500 begins in block 502 wherein the process determines whether there is a network or group security policy. If there is a network group/network security policy, then the process continues to block 504, wherein the process determines whether the "Shields Up" (i.e., "All block") option is enabled in the group or network security policies. If the "Shields Up" option is set, then the process returns GP_OVERRIDE or any other suitable value indicating a predication that because a group or network policy is overriding the user and administrator security policies, any operation to modify the local security policy will not be effective or, in some embodiments of the invention, may not be permitted. If the "Shields Up" option is determined to be not set in block 504, then the process 500 continues to block 506. In block 506 the process determines whether the network group or network security policy to which the computer system is subjected allows the user or the administrator security policy to be considered when executing operations on a computer system. In computer systems acting in accordance with one embodiment of the invention, a network group or network security policy may dictate that a user or an administrator security policy may be created and/or edited by a user or administrator of a computer system but may not permit the user or the administrator security policy to be effective. In computer systems acting in accordance with an alternative embodiment of the invention, a network group or network security policy may dictate that a user or an administrator security policy may not be created or edited. If consideration of a user or an administrator security policy is not permitted, then the process 500 returns GP_OVERRIDE or any other suitable value indicating a prediction that no operation to make changes to the user or administrator security policy will be effective. If, however, the network group/network policy does support consideration of the user or administrator security policy, or if it is determined in block 502 that there is no network group or network security policy, then in block 508 the process 500 determines whether the "Shields Up" option is set in the user or administrator security policy. If the "Shields Up" option is set locally, then the process 500 may predict that no operation to make changes made to the user or the administrator security policy will be effective, so the process 500 returns INBOUND_BLOCKED or any other suitable value to indicate this prediction. If, however, the "Shields Up" option is determined to be not set, then the process 500 returns OK or any other suitable value indicating a prediction that any operation to make changes to the user or administrator security policies will be effective.

Figure 6:
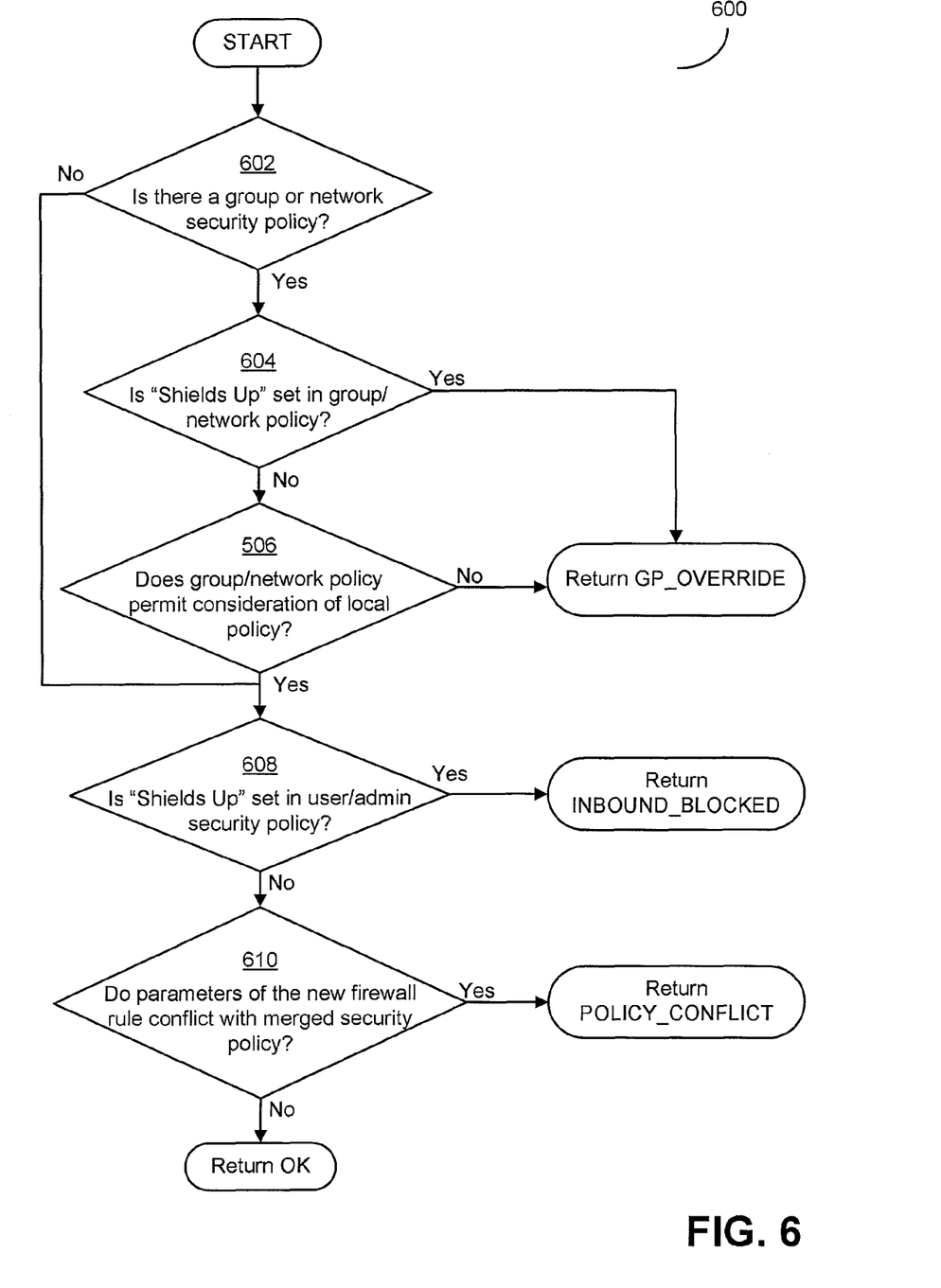
FIG. 6 is a flowchart of an illustrative process that may be implemented in accordance with one embodiment of the invention to determine whether specific configuration changes to a security policy may be made by a user or application.

FIG. 6 shows an illustrative process 600 for determining whether at least one operation to modify a user and/or an administrator security policy will be effective in view of a merged security policy. While the exemplary process 600 of FIG. 6 is limited to determining whether firewalls permit or prevent the at least one operation, embodiments of the invention are not limited in this respect and can make this determination with security methods other than firewalls either instead of or in addition to firewalls.

The illustrative process 600 shown in FIG. 6 is similar to the process 500, but differs in that it accepts input from a user or application regarding a proposed firewall rule or firewall rules to be implemented in the computer system as part of the user or administrator security policy, and returns an indication of whether at least one operation to implement the proposed firewall rule(s) will be effective in the computing environment of the computer system (i.e., whether the proposed firewall rules may be implemented and enforced). Blocks 602-608 of process 600 are similar in many respects to blocks 502-508 of process 500 described above. If the "Shields Up" option is determined in block 608 to be not set in the user or administrator security policy, however, process 600 continues execution in block 610 by comparing parameters of the proposed firewall rule(s) to the merged security policy for the computing environment to determine whether or not the proposed firewall rule(s) will be effective in view of the merged security policy. For example, a proposed firewall rule(s) may conflict with (i.e., be inconsistent with) one or more firewall rules on the same hierarchical level as the proposed firewall rule(s) (e.g., user or administrator) if the proposed firewall rule(s), for example, allow a certain type of communication and one or more existing firewall rules prohibit the type of communication or a subset of the type of communication. In some embodiments of the invention, the existing one or more firewall rules may be maintained by the computer system and, in these embodiments, then the process 600 returns POLICY_CONFLICT or any other suitable value indicating a prediction that one or more operations to implement the proposed firewall rule(s) will not be effective. In alternative embodiments of the invention, if the proposed firewall rule(s) conflict with one or more existing firewall rules, then the proposed rules may replace the existing firewall rules and, in these embodiments, the process 600 returns OK or any other suitable value indicating a prediction that one or more operations to implement the proposed firewall rule(s) will be effective. If one or more firewall rules above the proposed firewall rule in the security policy hierarchy conflicts with the new firewall rule, however, then the process 600 returns POLICY_CONFLICT or any other suitable value indicating a prediction that one or more operations to implement the proposed firewall rule(s) will not be effective.

It should be appreciated that the embodiments of the invention relating to determining whether at least one operation to modify a user or administrator security policy will be effective in view of a merged security policy are not limited to being implemented in the manner shown in FIGS. 5 and 6, as these aspects of the invention may be implemented in any suitable way. It should be further appreciated that while the illustrative processes of FIGS. 5 and 6 examine firewall policies for the firewall rules and firewall settings that are a part of the firewall policies to determine whether a specific operation is permitted, the invention is not limited in this respect as processes may be implemented for any type of security method.

Figure 7:
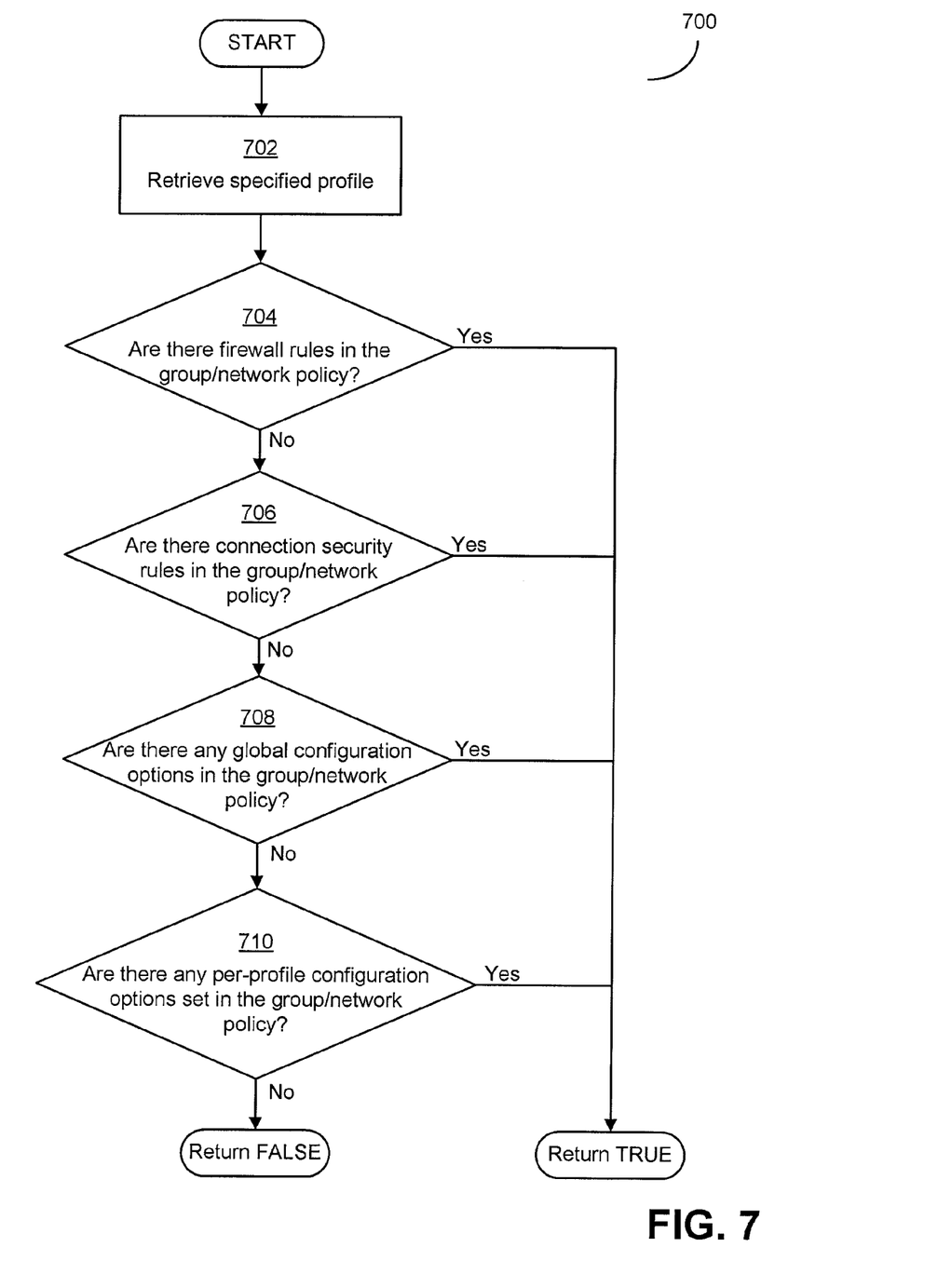
FIG. 7 is a flowchart of an illustrative process that may be implemented in accordance with one embodiment of the invention to determine whether a group or network security policy is impacting operation of a computer system.

FIG. 7 is a flowchart of an illustrative process for determining whether portions of a specific security profile are overridden by one or more network group or network security policy, and therefore whether operations to make changes to the user or administrator security policies of a computer system will be effective or ineffective. The process 700 begins in block 702, wherein a profile for the computer system is retrieved. The profile may be the current profile of the computer system and may be retrieved in any suitable way, such as the process of block 104 of FIG. 1, or may be a profile specified by a user or application and input to the process 700. The process 700 continues to block 704, wherein the group and network security policies for the current profile of the computer system are queried to determine whether they contain any firewall rules. If there are firewall rules, then the process 700 returns TRUE, because some elements of a merged security policy are controlled by a group or network security policy and therefore may override settings of user and/or administrator security policies and prevent operations to make changes to the user and/or administrator security policies from being effective. If it is determined that there are no firewall rules in the group or network security policies, then the process 700 continues to block 706, wherein it determines (e.g., by querying the network group or network security policy) whether there are any connection security policies or rules (e.g., Internet Protocol Security (IPsec) rules) in the group or network security policies. If any such connection security policies or rules are found, then the process 700 returns TRUE to indicate that some elements of a merged security policy are controlled by a group or network security policy and therefore may override settings of user and/or administrator security policies and prevent operations to make changes to the user and/or administrator security policies from being effective.

If no connection security rules are found in block 706, the process continues to block 708, wherein the process determines whether the group or network security policy for the specified profile has set configuration options globally (i.e., for all profiles rather than the profile specified in block 702). Global configuration options may be options such as the "Shields Up" option discussed above, or any other suitable option for controlling security of a computer system. If it is determined that there are global configuration options set in a group security policy or in a network security policy, the process 700 returns TRUE to indicate that some elements of a merged security policy are controlled by a group or network security policy and therefore may override settings of user and/or administrator security policies and prevent operations to make changes to the user and/or administrator security policies from being effective.

If it is determined in block 708 that there are no global configuration options set, the process continues to block 710, wherein the group and network security policies are queried to determine whether they contain any per-profile configuration options that apply to the current profile of the computer system. Similar to the global configuration options, per-profile configuration options may be any suitable setting that controls security of a computer system. For example, if the computer system is operating according to the "public" profile, and a group/network security policy enables the "Shields Up" configuration option in the "public" profile, then the process 700 returns TRUE to indicate that some elements of a merged security policy are controlled by a group or network security policy and therefore may override settings of user and/or administrator security policies and prevent operations to make changes to the user and/or administrator security policies from being effective.

If it is determined in block 710 that there are no per-profile configuration options set by the group/network security policy, then the process 700 returns FALSE, indicating that there are no security policies that override the local user or administrator security policies and therefore operations to make changes to the user and/or administrator security policies will be effective.

It should be appreciated that the embodiments of the invention relating to determining portions of a specific security profile are overridden by one or more network group or network security policy, and therefore whether operations to make changes to the user or administrator security policies of a computer system will be effective or ineffective are not limited to being implemented in the manner shown in FIG. 7, as these aspects of the invention may be implemented in any suitable way. The invention is not limited to examining a network group or network security policy to determine whether any or all of the types of security policies for which the process of FIG. 7 examines network group and network security policies, and may examine a network group or network security policy for any suitable type of security policy or types of security policies.

Figure 8:
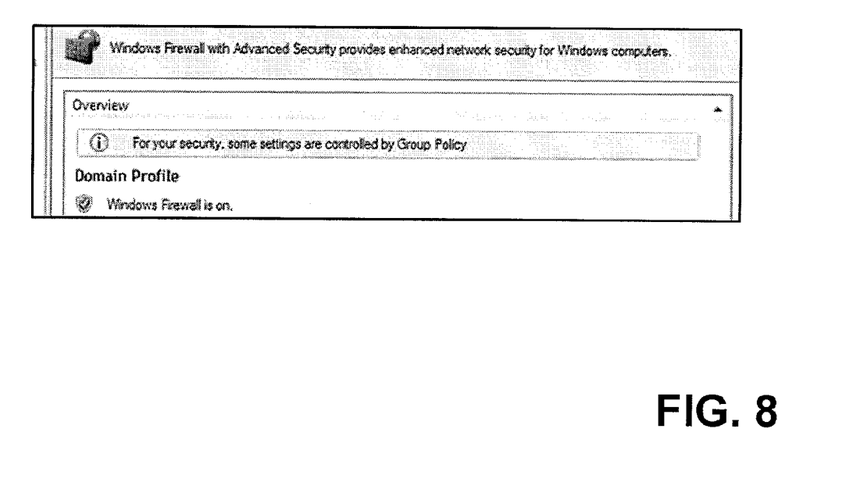
FIG. 8 is a graphical user interface that may be used in accordance with one embodiment of the invention to inform a user that a computer system is impacted by a group or network security policy.
Figure 9:
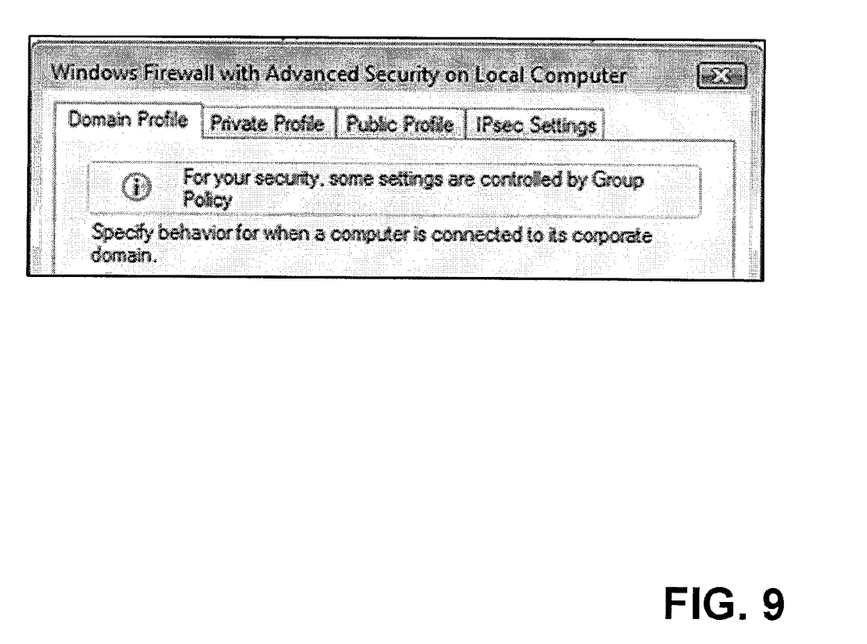
FIG. 9 is another graphical user interface that may be used in accordance with one embodiment of the invention to inform a user that a computer system is impacted by a group or network security policy.

FIGS. 8 and 9 show images of exemplary graphical user interfaces that may be used in accordance with some embodiments of the invention to display messages. In a computer system implementing methods such as the ones shown in FIGS. 5-7, for example, the computer system may make the user aware that a group or network security policy is controlling some of the security for the computer system by displaying a message of any type via a graphical user interface. This message may be, for example, "For your security, some settings are controlled by Group Policy," though it should be appreciated that any suitable message may be displayed. Rather than displaying a message via a graphical user interface, in some embodiments of the invention the computer system may additionally or alternatively be adapted to send a message to an application that is determining whether at least one operation will be effective in view of a merged security policy. This message may take any form. For example, the message may be in the form of a text string, a number that may be associated with a text string, or any other suitable message that may be received by a computer application. As shown in FIG. 8, this message may be displayed as a message indicating a current status of a security policy, or, as shown in FIG. 9, may be displayed as a per-profile message for each profile, including profiles that are not currently selected.

It should be appreciated that embodiments of the invention are not limited to implementing the illustrative graphical user interfaces shown in FIGS. 8 and 9. Embodiments of the invention are not limited to implementing any particular graphic interface or type of graphical user interface, as any suitable graphical user interface may be implemented. Further, it should be appreciated that some embodiments of the invention are not limited to displaying messages to a user or application regarding a status of one or more profiles or security policies.

Figure 10:
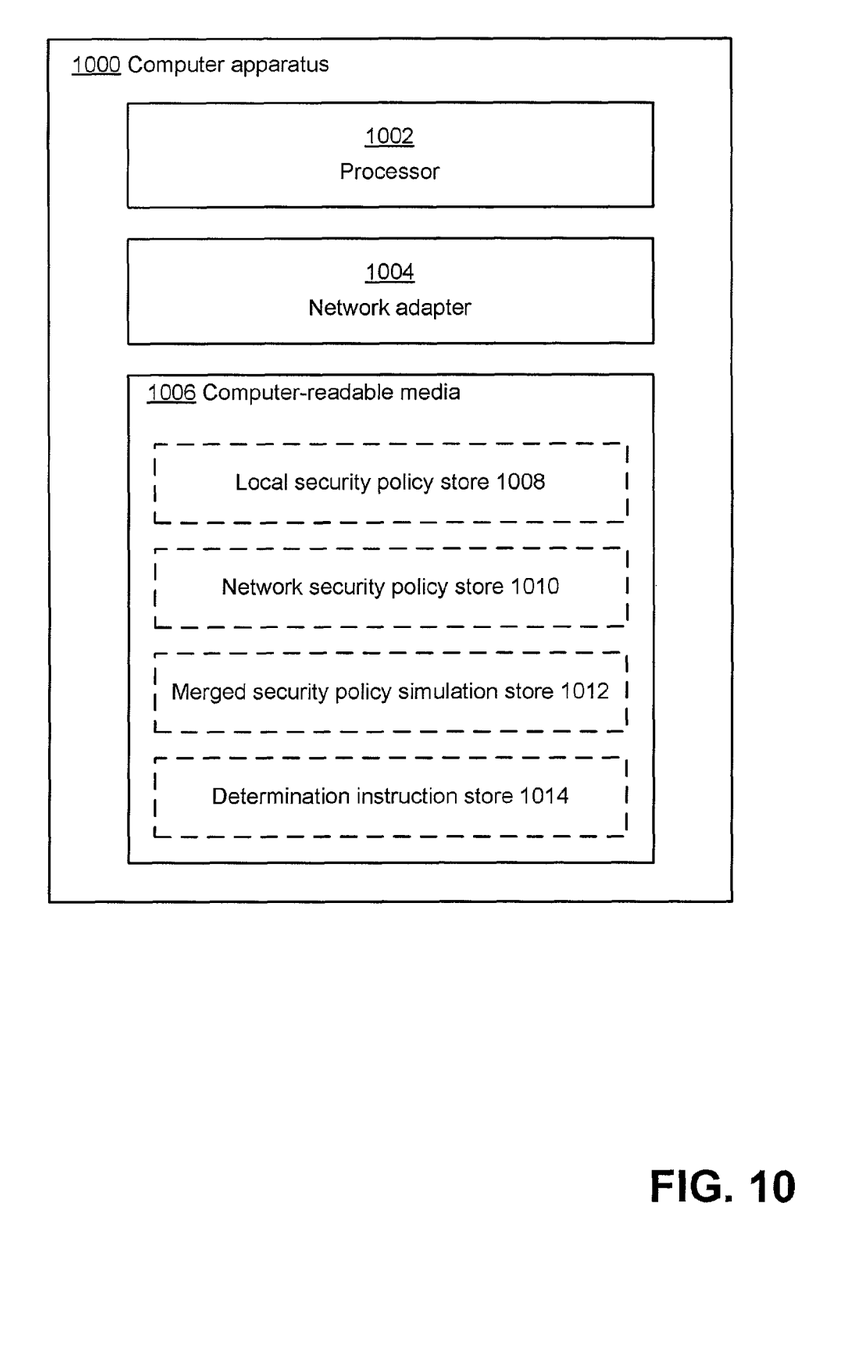
FIG. 10 is an exemplary computer apparatus that may be used in accordance with one embodiment of the present invention.
Figure 11:
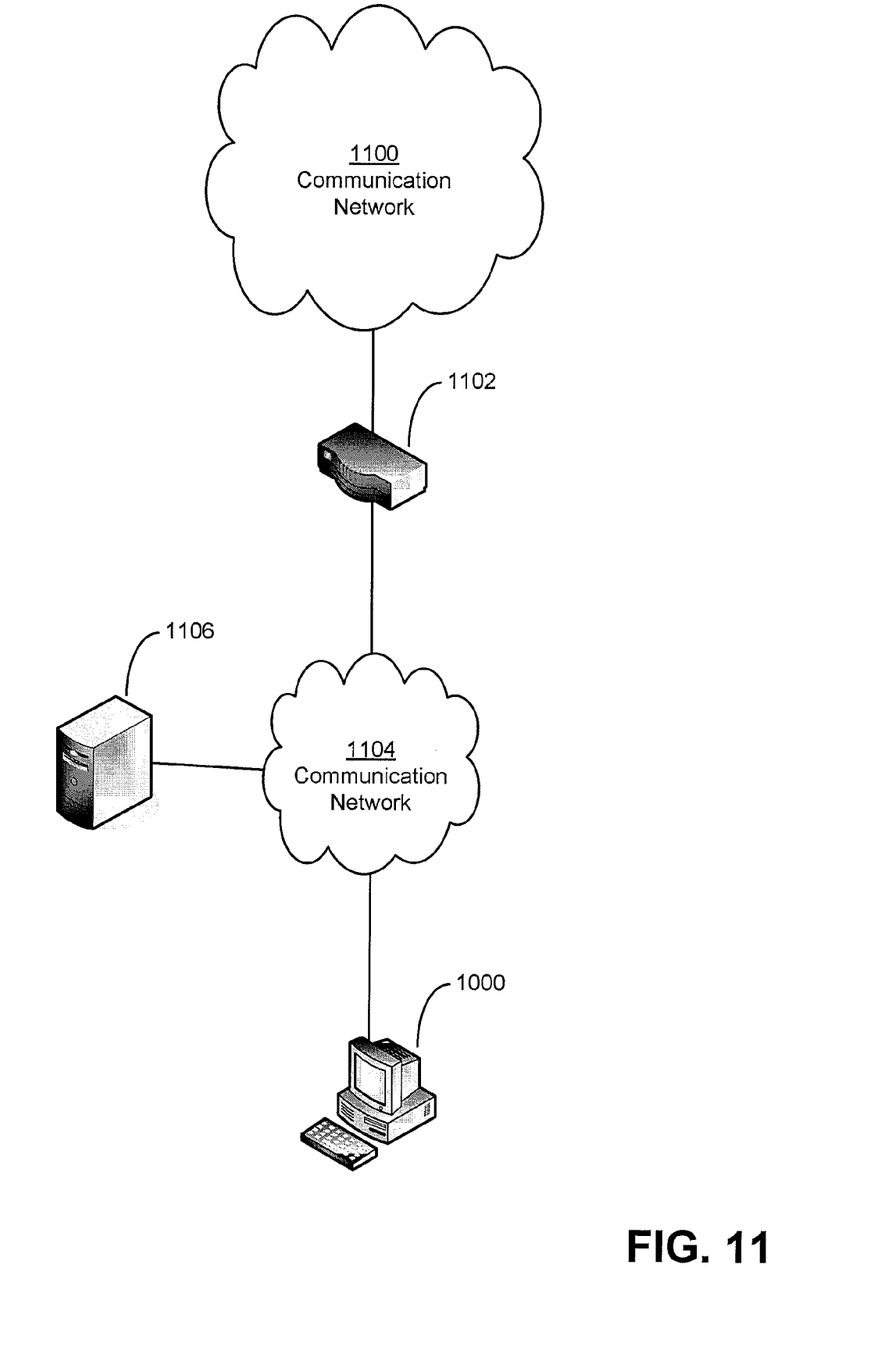
FIG. 11 is an exemplary computer system on which embodiments of the invention may be implemented.

The aspects of the present invention described herein may be implemented on any of numerous computer system configurations and are not limited to any particular type of configuration. FIGS. 10-11 show various computer systems in which embodiments of the invention may act, though others are possible.

FIG. 10 shows a computer apparatus 1000 which may act as a computer system in accordance with one or more embodiments of the invention. It should be appreciated that FIG. 10 is intended to be neither a depiction of necessary components for a computing device to operate as a computer apparatus with embodiments of the invention, nor a comprehensive depiction. As discussed above, any suitable computing device may be used as a computer apparatus 1000 to determine whether a merged security policy permits at least one operation to be effective. Computer apparatus 1000 may be a computing device designed for multiple purposes and for use by a user, such as a desktop personal computer, a laptop personal computer, a server, a personal digital assistant (PDA), a smart/mobile telephone, or any other suitable electronic device. Alternatively, computer apparatus 1000 may be any computing device not intended for typical use by a user or intended for a single purpose or limited purposes, such as a server, a rack-mounted networking device, or a standalone networking device such as a switch, hub, router, access point, hardware firewall, or any other suitable electronic device.

As shown in FIG. 10, computer apparatus 1000 comprises a processor 1002, a network adapter 1004, and computer-readable media 1006. Network adapter 1004 may be any suitable hardware and/or software to enable computer apparatus 1000 to communicate with any other suitable computing device over any suitable computing network. The computing network may be any suitable wired and/or wireless communication medium or media for exchanging data between two or more computers, including the Internet. Computer-readable media 1006 may be adapted to store data to be processed and/or instructions to be executed by processor 1002. Processor 1002 enables processing of data and execution of instructions. The data and instructions may be stored on the computer-readable media 1006 and may, for example, enable communication between components of the computer apparatus 1000.

In accordance with some embodiments of the invention, the data and instructions stored on computer-readable media 1006 may comprise a local security policy store 1008 and a network security policy store 1010. As discussed above, the local security policy store 1008 may comprise one or more security policies established for individual users (the user security policy), for the particular computer system 1000 (the administrator security policy), and computer systems connected to a network (the group security policy). The network security policy store may comprise one or more security policies retrieved from other computer systems that are above the computer system 1000 in a computer network hierarchy. It should be appreciated that embodiments of the invention may store any combination or number of security policies in the local and network security policy stores, and may not store all possible security policies. Computer-readable media 1006 may further comprise a merged policy store 1012 that may store a merged security policy in any suitable format, such as in a single data structure or in multiple, linked data structures, as discussed above. Computer-readable media 1006 may further comprise computer-executable instructions for retrieving network security policies and for merging security policies in any suitable manner to determine a merged security policy. These computer-executable instructions may further comprise instructions for querying a merged security policy to determine contents and parameters of the merged security policy that may be used to determine whether at least one operation will be effective in view of a merged security policy. These computer-executable instructions may be stored in a determination instruction store 1014.

Computer apparatus 1000 may be disposed with a computer system and connected to a computer network. FIG. 11 shows one exemplary computer system in which embodiments of the invention may act, though others are possible. In FIG. 11, computer apparatus 1000 is connected to a communication network 1104. As discussed above, communication network 1104 may be any suitable wired and/or wireless communication medium or media for exchanging data between two or more computers. Communication network 1104 may be implemented as an enterprise network (e.g., a local area network) that groups together two or more computer apparatuses that are organizationally joined. Computer apparatus 1106 may also be connected to communication network 1104. In one embodiment of the invention, computer apparatus 1106 may be a network element such as a network domain controller that provides group security policy and other computer network-related information to computer apparatus 1100. Computer apparatus 1102 may also be connected to communication network 1104 and communication network 1100. Communication network 1100 may be any suitable wired and/or wireless communication medium or media for exchanging data between two or more computers, including the Internet. Communication network 1100 may join together a plurality of enterprise networks such as communication network 1104. Computer apparatus 1102 may be a network element controlling access to communication network 1104 and controlling communication between communication network 1104 and communication network 1100. As described above, computer systems in a computer network may be implemented in a computer network hierarchy. Such a hierarchy is depicted in FIG. 11, wherein computer apparatus 1102 is "above" computer apparatus 1000 in the computer network. Computer apparatus 1102 may be considered to be above computer apparatus 1000 because, being the link between communication network 1104 and communication network 1100 and therefore closer to communication network 1100, it is farther upstream in a data flow. In other words, any data that is being sent to computer apparatus 1000 from communication network 1100, or vice versa, must pass through computer apparatus 1102, and it is therefore higher in a hierarchy.

It should be appreciated that while FIG. 11 shows computer apparatus 1000 as a desktop computer, embodiments of the invention may implement computer apparatus 1000 as any suitable network device, as discussed above. For example, a network element such as computer apparatus 1102 may be implemented as a computer system in accordance with embodiments of the invention.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. At least one computer-readable storage medium having encoded thereon computer-executable instructions which, when executed, perform a method, wherein the at least one computer-readable storage medium is not a signal, the method comprising:
    retrieving a plurality of firewall policies that are enforced by respective different firewalls of respective different devices on the network, each firewall policy comprising one or more firewall rules, the firewall policies including a target firewall policy of a target firewall of a target device, the target firewall policy having higher or lower precedence relative to another of the firewall policies;
    merging the retrieved firewall policies into a merged firewall policy that includes firewall rules corresponding to each of the retrieved firewall policies; and
    receiving a new firewall rule, the new firewall rule specifying a communication allowance or disallowance, and automatically determining, according to the merged security policy, whether the communication allowance or disallowance will be effected for the target device if the new firewall rule is applied to the target firewall policy and implemented by the target firewall.

2. The at least one computer-readable storage medium of claim 1, wherein the new rule corresponds to one or more applications, and determining whether the at least new rule will be effective comprises determining whether the one or more applications will be capable of communicating.

3. The at least one computer-readable storage medium of claim 1, wherein the determining comprises querying the merged security policy with the new rule.

4. An apparatus for use in a computer environment, the computer environment comprising at least one local computer system with a local firewall and a remote computer system with a remote firewall, wherein the local firewall enforces a local firewall policy and the remote firewall enforces a remote firewall policy that affects communications of the local computer system, the apparatus comprising at least one processor programmed to:
    receive at least one input comprising a candidate firewall operation comprising a proposed firewall rule,
    retrieve the local firewall policy and the remote firewall policy, wherein the local firewall policy is enforced by the local firewall and the remote firewall policy is enforced by the remote firewall, and wherein the local firewall policy is retrieved from the local firewall that enforces the local firewall policy and the remote firewall policy is retrieved from the remote firewall that enforces the remote firewall policy,
    determine a merged firewall policy by aggregating the retrieved local and remote firewall policies, and
    process the at least one input to determine, using the merged firewall policy, whether the candidate firewall operation will be effective in view of the merged security policy.

5. The apparatus of claim 4, wherein the at least one firewall operation comprises modifying the local firewall policy, and the determining comprises determining whether the local firewall policy as modified by the candidate firewall operation will be effective in view of the merged firewall policy.

6. The apparatus of claim 5, wherein the modifying comprises adding the proposed firewall rule to the local firewall policy and determining whether the local firewall policy will be effective comprises determining whether communication specified as allowable by the candidate firewall rule will be allowed if the candidate firewall rule is implemented by the local firewall.

7. A method for use in a computer environment comprising at least one computer and a firewall on the computer that implements a plurality of distinct firewall policies for the computer system, a first firewall policy having higher precedence than a second firewall policy such that when implemented by the firewall any firewall rules in the first firewall policy have precedence over any rules in a second firewall policy the method comprising acts of:
    retrieving the firewall policies comprising the first firewall policy and the second firewall policy, wherein the first firewall policy is enforced by the firewall with higher precedence than the second firewall policy as enforced by the firewall,
    receiving a request comprising a candidate firewall rule modification, the candidate firewall rule modification specifying communications to be enabled or disabled; and
    determining whether the communications will be enabled or disabled as specified by the candidate rule by evaluating the candidate firewall rule against the retrieved first firewall policy and the retrieved second firewall policy and by taking into account the higher precedence of the first firewall policy relative to the second firewall policy.

8. The method of claim 7, wherein the firewall negotiates and enforces security for connections, and wherein the first firewall policy specifies sets firewall policy for a group of computers and the second firewall policy sets firewall policy for the at least one computer.

9. The method of claim 8, wherein the computers in the group of computers each has a firewall that implements the first firewall policy.

10. The method of claim 7, wherein the second firewall policy comprises a local firewall policy and the first firewall policy comprises a group firewall policy, and wherein the determining comprises determining whether the group firewall policy overrides the local firewall policy.

* * * * *